United States Patent

[11] 3,547,260

[72] Inventor Dorothy R. Munn
 Lomita, Calif.
[21] Appl. No. 791,507
[22] Filed Jan. 15, 1969
[45] Patented Dec. 15, 1970
[73] Assignee Grefco, Inc.
 Philadelphia, Pa.
 a corporation of Delaware

[54] PROCESS FOR BENEFICIATING DIATOMACEOUS EARTH ORES AND PRODUCT
 15 Claims, No Drawings

[52] U.S. Cl. ..................................................... 209/3,
 209/5, 209/12
[51] Int. Cl. ..................................................... B03b 1/04,
 B03d 3/00
[50] Field of Search ......................................... 209/2, 3, 5,
 9, 211, 10, 12, 17

[56] References Cited
 UNITED STATES PATENTS

| | | | |
|---|---|---|---|
| 1,606,281 | 11/1926 | Williams ....................... | 209/5 |
| 2,085,537 | 6/1937 | Lyons ........................... | 209/2X |
| 3,375,922 | 4/1968 | Martin et al. .................. | 209/5 |

*Primary Examiner*—Frank W. Lutter
*Attorney*—Mc Clure, Weiser & Millman and Everett H. Murray, Jr.

ABSTRACT: Crude diatomaceous earth is prepared, principally by milling, to a relatively fine particle size, preferably at least about 100μ and then suspended in water. The suspension is prepared so that the solids concentration is in the range of about 5 to 35 percent by weight. The water employed must be substantially free from divalent, trivalent and tetravalent cations. The slurry of the crude ore in water is adjusted and maintained at a pH in the range of about 8.3 to 11:7. After the adjustment of the slurry to the aforementioned pH, the solids concentration of the slurry is adjusted to about 5 to 20 percent, principally by the addition of water of the type described hereinabove. The slurry is then processed to remove all particles which are larger than 44μ, leaving a suspension of diatomite and, principally, clay particles smaller than 44μ. Finally, the diatomite particles are removed as a wet cake from the suspension, yielding a product of considerable beneficiation having markedly enhanced commercial value.

PROCESS FOR BENEFICIATING DIATOMACEOUS EARTH ORES AND PRODUCT

The present invention deals with a method for beneficiating crude diatomaceous earth ores in order to remove deleterious impurities and thereby appreciably beneficiating the diatomite values. More particularly, the present invention relates to a method for beneficiating diatomaceous earth-containing ores which are contaminated principally with varieties of clay, but also with other impurities, in order to improve the quality of the diatomaceous earth, thereby rendering it more valuable for use in high quality diatomaceous filteraids.

Diatomaceous earth filteraids have been used for many years for removing finely divided and colloidal suspended particles from liquids. These filteraids are usually employed by admixing a small amount of the filteraid with the liquid to be filtered and thereafter passing the liquid through a septum (screen, cloth or other permeable support) on which the filteraid and entrained suspended particles are retained while the liquid passes through in a clarified condition. The filteraids can also be used on "precoat filters" on which the filteraid is deposited upon a filtration apparatus such as a rotary drum fitted with a screen or other septum maintained under vacuum. The liquid is passed through the precoat (with or without body feed of filteraid) and the undesirable suspended matter is retained on the precoat filteraid. Diatomaceous earth also can be used in numerous industrial products such as fillers, catalyst bases, and paint additives, among others.

It is now recognized that the proven reserves of high quality diatomaceous earth ore deposits are diminishing and methods must be found to utilize lower quality deposits. At the present time, the total of significant high quality diatomaceous earth deposits in the united States numbers fewer than six, the main deposits being located near Lompoc, Calif. Since the reserves of high grade deposits are limited and there are large deposits available that are low in purity, usually contaminated by clay and other minerals, it is highly desirable to extend the reserves of diatomaceous earth ore in the United States by means of effective and commercially attractive beneficiation.

It is the principal object of this invention to provide a method for upgrading diatomaceous earth ores of various degrees of impurity which otherwise makes them unsuitable for direct use in high quality diatomaceous earth filteraids.

It is an additional object of this invention to provide a method whereby clay and other impurities, principally mineral, in crude diatomaceous earth ore deposits can be separated from the diatomite values by commercially attractive methods in order to provide a material which can be directly employed by conventional, commercially acceptable methods for use as high quality diatomaceous earth filteraids.

Diatomaceous earth is known to be a type of siliceous mineral which is composed of diatoms which are microscopic organisms. The desirable characteristics of this material are its closed cells and high porosity.

In accordance with the present invention, a crude diatomaceous earth (D.E.) ore, preferably containing more than 50 percent of diatom particles with the balance consisting of various types of clays, opaline materials, sand, iron compounds and other impurities, is subjected to a wet or dry milling operation in which the ore is preliminarily crushed and screened, after which it is suspended or slurred in a considerable volume of water and agitated or otherwise dispersed therein. A dispersing agent such as tetrasodium pyrophosphate or sodium hydroxide may be added, if desired.

In a present sense the term "milling" is employed to encompass the idea that principally the process achieves the disaggregation of diatomite-impurity aggregates, and ideally this is all that would occur. However, it is known, and such is to be included in the present definition, that some breakage of the diatoms occurs, which is inevitable under present practical commercial operations. This does not adversely affect the present process.

The crude ore should be milled to a particle size of at least essentially −65 mesh, preferably to a particle size of at least essentially 200 mesh. In many instances, the particle size can be prepared to a size of 325 mesh or even smaller.

The pH of the aqueous slurry is adjusted to a range of 8.3 to 11.7, preferably 9.5 to 11.5. The pH adjustment is consummated by the use of strong monovalent bases, preferably inorganic bases. Typically, one may employ sodium hydroxide, potassium hydroxide, lithium hydroxide, ammonium hydroxide or equivalent organic bases as quaternary ammonium hydroxides, organic amines, and the like. Typical organic bases include tetra alkyl ($C_1$ to $C_4$) ammonium hydroxide, aniline, pyridine, alkyl amines of various straight and branch chain structures. Any of these is satisfactory as long as they can provide the aforestated pH and are analogous to the monovalent inorganic cations mentioned previously. It is preferred principally because of commercial considerations to employ sodium hydroxide or ammonium hydroxide.

The percent of the crude diatomaceous earth ore solids in the original slurry should be in the range of 5 to 35 percent by weight, preferably 27 to 32 percent by weight. Within the broader range the actual percent is not particularly critical and would generally be the result of economic evaluations of the particular characteristics of the ore being subjected to beneficiation.

It is essential to the success of the present process to employ water that is substantially free from divalent, trivalent or tetravalent cations since presence of any amount of these cations adversely affects the result of the present process. In the present instance, the term "substantially free" means that these cations can be tolerated in amounts of not more than 20 p.p.m. The anion content of the water is not critical.

After the original slurry has been adjusted to the alkalinity described hereinbefore, i.e., 8.3 to 11.7, preferably 9.5 to 11.5, the solids concentration of the slurry is adjusted to the range of about 5 to 20 percent, preferably 9 to 15 percent, by weight. If adjustment of the solids content is required for the higher concentrations of original slurries, such is achieved by the addition thereto of water of the type described above, i.e. that is free from divalent, trivalent, and tetravalent cations. As will be indicated at a later step, it is also possible at this stage of the operation to use, by recycling, the supernatant suspension that results from the final step of the present process.

At the next stage the coarse particles, frequently referred to as "grit", are removed by any conventional process, such as screening, centrifuging, liquid cyclone separation, or the like. The particles to be removed at this stage of the operation are those which are larger than $44\mu$ and would be removed by screening using a 325 mesh screen. This operation permits the passage of a suspension of diatomite, clay particles, and other impurities which are smaller than $44\mu$ in size.

The diatomite content in the suspension is then separated as a wet cake by gravity settling or centrifugation, as desired. It is frequently preferable to use a gravity settling technique even though large tanks are required. The supernatant suspension contains clay particles and other impurities as well as the alkaline values added near the beginning of the present method. It is frequently economically advantageous to employ, by recycling, up to 50 percent by volume of this supernatant suspension of clay and other impurities (frequently referred to in the art as "slimes") in the previous step following the initial pH adjustment where adjustment of the solids concentration of the slurry is to be performed. Such use of the final supernatant suspension is limited to about a 67 percent recycling and preferably about 50 percent recycling since larger percentages appear to hinder the final diatomite separation. It is to be emphasized that from the first adjustment to the final separation of diatomite, the pH is maintained in the alkaline range of 8.3 to 11.7, preferably 9.5 to 11.5, in order to assure the maximum benefits of the present process. There is an appreciable decrease in the pH of slurry with the passage of time, largely because of absorption of carbon dioxide from the air and reaction of the base values with clay. Frequently these reactions are of such magnitude that the pH is reduced below the acceptable lower limit. Accordingly, it is usually necessary to add sufficient alkali from time to time in order to maintain the necessary pH range discussed hereinabove.

The product of the invention is a clay-free diatomite cake unlike other settled insoluble and otherwise porous materials. The present cake is very compact, quite hard, tenacious, tough, yet cuttable, of high solids (38—40 percent) content, and easily harvested through the overlying slurry without appreciable sloughing-off at the edges nor with any water penetration into the cake. Furthermore, after the upper slurry is decanted or pumped off, the cake is harvestable with front end loaders, drag lines, and the like, yielding material similar in handling characteristics (such as moisture content and "chunkyness") to normal feedbelt material which has been freshly mined from existing beds.

In the following examples, an indication of the efficiency of the process in removing clay, iron compounds and other impurities which would contaminate the diatomaceous earth particles and prevent utilization as a filteraid, is measured by calcining the crude material put into the process and the diatomaceous earth product produced as a final product at temperature between 1,600,° and 1,800°F. with from 6 to 7 percent by weight of sodium carbonate. The calcined product is then tested for "Brightness" (Br.) which measures the reflectance of the surface of the product expressed in percent of a standard (MgO) assigned a value of 100, measured on a Photovolt Reflection Meter, Model 610 (green filter), calibrated against a General Electric meter. The standard product has a brightness of 85 and this is considered to be adequate for "feed belt" quality diatomaceous earth material. Brightness values figure indicate progressively poorer "feed belt" quality raw material to a conventional diatomaceous earth filteraid manufacturing operation; and brightness values higher than 85 indicate progressively improved "feed belt" quality product.

Another indication of the suitability of the product produced by the process of this invention is the cake density (C.D.) of the material. This is obtained by milling the flux calcined product, suspending it in water and then recovering the diatomaceous earth filteraid particles on a vacuum filter and measuring the density of the cake in pounds per cu. ft. In general, cake densities higher than 19 pounds per cu. ft. are unsuitable as high quality diatomaceous earth filteraid products. Products having cake density values below 19 are deemed suitable and acceptable by industrial users of high quality diatomaceous earth filteraid products.

In the following table, three examples of the invention are illustrated employing three different types of crude ore. The flow rates (F.R.) of the feed material and the product, in each instance, were tested in a filtration of a standard 60° Brix aqueous solution of raw sugar at 80°C. To samples of this liquid were added 0.3 percent of filteraid (based upon the solids content of the sugar solution). The resulting slurry was passed through a ¾-inch diameter filter over a 21-minute cycle with a constant pressure of 20 pounds per square inch with the results indicated in the table. For comparative purposes, a standard quality diatomaceous earth filteraid is used with an assigned value of 100.

One indication of the effectiveness of the process is the reduction of coarse material in the settled product. This is shown in the following table as "+30 microns" material.

In the following examples, the crude material was laboratory processed by blunging and rolling with a shearing action in a slurry of softened water at anywhere from 20 to 30 percent solids until a good dispersion was obtained. To achieve good dispersion and to adjust the pH of the dispersion to about 9.5 to 10.5, approximately 0.5 to 10 pounds of caustic, tetrasodium pyrophosphate or equivalent alkaline dispersing agent were added per ton of dry crude used. The slurry was then diluted to about 10 percent solids in a measured container and siphoned from the settled coarse particles within a period of 1 to 6 minutes; this settling operation was performed so that the siphoned slurry was free from plus 40—44 micron material. The siphoned slurry was then put into a container, the pH adjusted to 9.5—10.5, and allowed to stand long enough to settle virtually all the diatomaceous earth—usually 4 to 16 hours per inch of depth as measured from the top of the slurry to the bottom of the container.

After the final settling, the supernatant slimes were decanted leaving a firm, coherent, wet cake of beneficiated diatomaceous earth containing 60 to 65 percent by weight of water. After drying, the products were calcined with 4 to 6½ percent soda ash at 1,600° to 1,800°F., the agglomerated product was milled slightly and then determinations were made for flow rate, cake density, brightness and plus 30 microns properties which appear in the following table.

TABLE

| Example No. | F.R. | C.D. | Br. | +30 microns |
|---|---|---|---|---|
| 1—DE Crude No. 1: | | | | |
| Feed | 46 | 21.6 | 73.5 | 31.5 |
| Product | 86 | 14.0 | 95.0 | 17.0 |
| 2—DE Crude No. 2: | | | | |
| Feed | 180 | 24.1 | 81.0 | 53.9 |
| Product | 161 | 16.6 | 92.5 | 29.0 |
| 3—DE Crude No. 3: | | | | |
| Feed | 150 | 27.3 | 57.0 | 55.5 |
| Product | 104 | 16.9 | 86.5 | 30.0 |

It can be readily discerned from the above data that in all cases the use of the process of the present invention significantly enhanced the desired properties of the diatomaceous earth. This is particularly true with respect to flow rate, cake density, brightness and removal of large particles.

I claim:

1. A process for recovering the diatomite values from a crude diatomaceous earth ore containing clay and other impurities comprising adding water essentially free of di-, tri- and tetravalent cations to an aqueous slurry of said crude ore particles, said slurry having a solids concentration in the range of about 5 to 35 percent by weight, the particles thereof being of a size of at least about −65 mesh, and the water of said slurry being essentially free of di-, tri- and tetravalent cations, until the solids content is decreased to about 5 to 20 percent by weight, thereby forming a more dilute slurry, said slurry having a pH in the range of about 8.3 to about 11.7, separating from said slurry a suspension of diatomite, clay particles and other impurities of a particle size essentially smaller than 44$\mu$, and separating therefrom the diatomite as a wet cake.

2. The process of claim 1 in which the particle size of the slurry is at least essentially −200 mesh and the solids content is further adjusted to within the range of about 9 to 15 percent by weight.

3. The process of claim 1 in which the suspension of diatomite, clay particles and other impurities of a particle size smaller than 44$\mu$ is separated by means of a liquid cyclone separator, and the diatomite is recovered therefrom by gravity settling.

4. The process of claim 1 wherein the pH of the slurry of particles smaller than 44$\mu$ is adjusted to a range of about 9.5 to 10.5 before separating the diatomite.

5. A process for recovering diatomite from a crude diatomaceous earth ore containing clay and other impurities comprising preparing an aqueous slurry of crude ore particles of a size of at least about −65 mesh and a solids concentration in the range of about 5 to 35 percent by weight, the slurry having a pH range of about 8.3 to about 11.7 and the water thereof being essentially free of di-, tri- and tetravalent cations, separating from said slurry the particles which are larger than about 44 microns, thereby yielding a suspension of a supernatant of slimes, diatomite, clay particles and other impurities which are smaller than about 44 microns as a settled fraction, and separating from said suspension the diatomite.

7. The process of claim 5 wherein the separation of the diatomite is by gravity.

8. The process of claim 7 wherein the separated diatomite is a cake of a solids content in the range of about 35 to about 40 percent.

6. The process of claim 5 wherein the cation content of the water containing the diatomite is not more than 20 p.p.m.

9. The process of claim 8 wherein the diatomite cake is harvested by collecting it through the overlying slurry.

10. The process of claim 9 which comprises the step of harvesting the diatomite cake without appreciable breaking off at the edges or water penetration into the cake.

11. The process of claim 8 wherein the cake is essentially free of clay.

12. The process of claim 5 which comprises the step of adding to the aqueous slurry which contains particles larger than about 44 microns at least a portion of the supernatant suspension of particles smaller than about 44 microns.

13. The process of claim 12 wherein the volume of the supernatant suspension which is added does not exceed about 50 percent by volume of the starting slurry.

14. The process of claim 5 wherein there is added water essentially free of di-, tri- and tetravalent cations to the starting slurry until there is reached a solids content of about 5 to 20 percent.

15. The process of claim 5 wherein the particles which are larger than about 44 microns are removed as an aqueous suspension from the remaining slimes of diatomite, clay particles and other impurities.